Dec. 10, 1968
J. A. CARLEY
3,416,020
FILAMENT DISPLAY DEVICE INCLUDING A
RIGID, LIGHT-ABSORBING, SUPPORT
PANEL
Filed Feb. 14, 1966
FIG.1
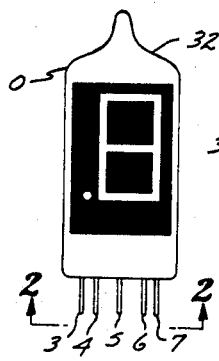
FIG.2
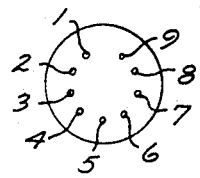
FIG.3
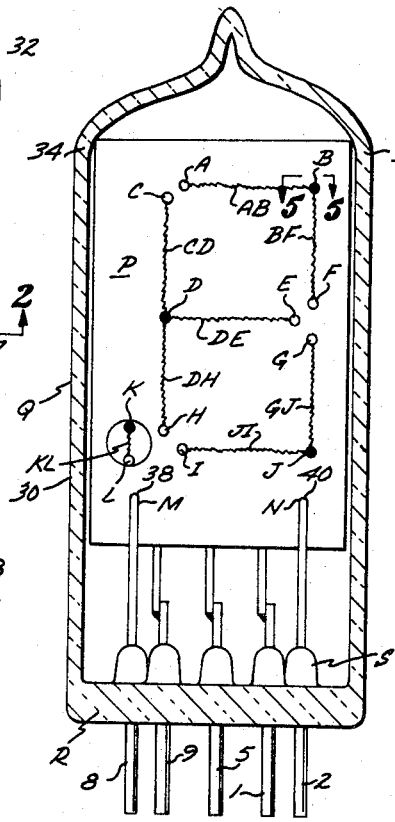
FIG.4
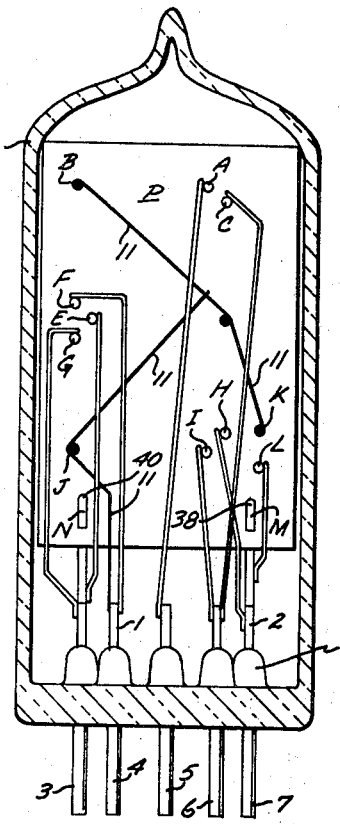
FIG.5
FIG.6
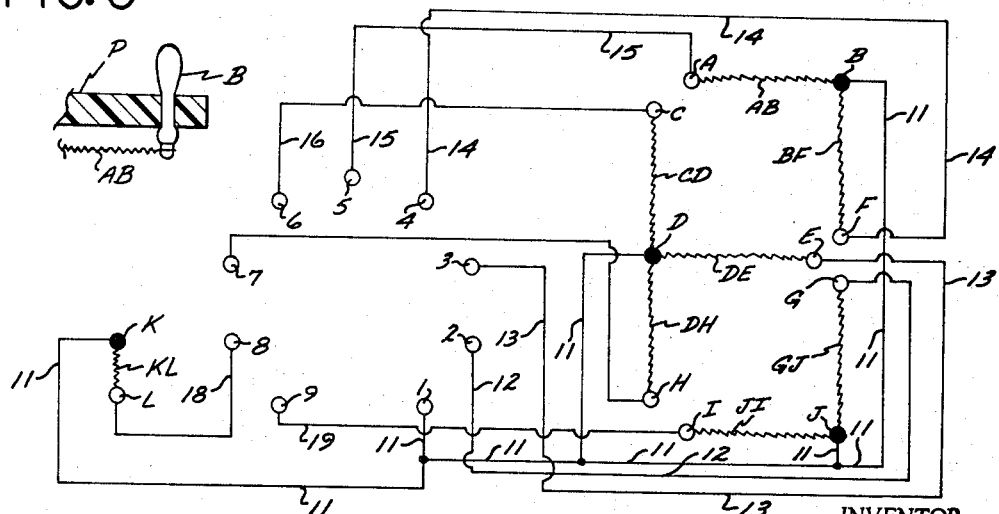
INVENTOR.
JAMES A. CARLEY
BY
William Q. Bobcock
ATTORNEY United States Patent Office 3,416,020
Patented Dec. 10, 1968

3,416,020
FILAMENT DISPLAY DEVICE INCLUDING A RIGID, LIGHT-ABSORBING, SUPPORT PANEL
James A. Carley, Rolling Hills, Calif., assignor to Los Angeles Miniature Products, Inc., Gardena, Calif., a corporation
Filed Feb. 14, 1966, Ser. No. 527,373
7 Claims. (Cl. 313—109.5)

ABSTRACT OF THE DISCLOSURE

An electrically operated display device that includes a plurality of filaments which may be selectively and electrically energized in various combinations to produce any one of a predetermined number of high intensity lighted symbols that are viewed against a dark light-absorbing background, and as a result, are sharply defined when seen in either darkness or daylight.

---

During the past few years, the use of computers and various information retrieving systems has increased tremendously, a large percentage of which have been provided with display or read-out devices, which visually indicate the sought-after answer or information in the form of two-dimensional illuminated images.

A major disadvantage of information display devices available heretofore has been the low light contrast between the illuminated image and that of the ambient atmosphere, and to such extent that the information projected thereby must be viewed in a darkened room rather than in full daylight or sunlight.

A major object of the present invention is to provide an electrically operated display device in the form of a read-out tube that is capable of selectively forming any one of a number of symbols in high intensity light, two-dimensional form which are readable in full daylight or sunlight, as well as by an observer positioned directly in front of the read-out tube, or a reasonable distance to the side thereof.

Another object of the invention is to provide an electrically operated read-out tube that may be used equally well in either a dark or light environment, is relatively small in size, lightweight and yet rugged, may be used under humid conditions, and is not adversely affected by reasonable shock or vibration.

Another object of the invention is to supply an electrically operated display device of extremely simple structure that can be fabricated from standard, commercially available materials, and manufactured at a sufficiently low cost as to encourage the widespread use thereof.

Another object of the invention is to provide a read-out tube by which sought-after information may be supplied in the form of a two-dimensional symbol of extremely high intensity light, with the symbol being viewed against a light-absorbing dark background to minimize light reflection of the illuminated symbol and thus maintain the illuminated symbol in sharp contrast to the background against which it is seen.

Another object of the invention is to provide a display device which produces a selected symbol having a high intensity light that may be seen from a greater distance possible by the use of display devices of the type described available heretofore.

These and other objects and advantages of the present invention will become apparent from the following description thereof, and from the accompanying drawing illustrating the same, in which:

FIGURE 1 is a front elevational view of the read-out tube which has been electrically energized to produce a high intensity light symbol of the numeral 8 showing an illuminated decimal point to the left thereof;

FIGURE 2 is a bottom plan view of the device, taken on the line 2—2 of FIGURE 1;

FIGURE 3 is a longitudinal cross-sectional view of the read-out tube illustrating the forward portion of the panel therein and associated elements;

FIGURE 4 is a second longitudinal cross-sectional view of the device illustrating the rear surface of the panel in the tube and associated elements;

FIGURE 5 is an enlarged fragmentary cross-sectional view of a crimped electrical conductor supported in an opening in a ceramic panel, taken on the line 5—5 of FIGURE 3; and FIGURE 6 is a wiring used in the read-out tube.

With continued reference to the drawing for the general arrangement of a preferred form of the invention generally designated by the letter O, the detailed structure thereof is illustrated in FIGURES 1–4 inclusive. The invention O includes a thin rectangular panel P, preferably formed from a black ceramic material, as can best be seen in FIGURES 3 and 4. Panel P is disposed inside a rigid transparent tube Q defined by a cylindrical side wall 30, a first end of which develops into a curved upwardly and inwardly tapering top 32, and a second end that sealingly engages a circular base R which may be formed from the same material as that of the envelope. The transparent material of the envelope Q and base R is glass.

Upper corners 34 of panel P engage the interior surface of the top 32 to prevent lateral movement of the panel relative to the envelope Q. A number of parallel, circumferentially spaced electrical conducting pins 1–9 inclusive project upwardly through the base R and are sealingly engaged thereby, the arrangement of which is shown in FIGURE 2. It will be noted that pins 1 and 9 are spaced a greater distance from one another than the balance of the pins, which permits easy identification of the pins by number in the event numerals are not printed thereon. The upper portions of pins 1–9 inclusive (FIGURE 3) that are disposed above the base R, and the lower portions thereof situated therebelow may be removably inserted in a socket (not shown) of conventional design that is adapted to receive the same.

Pins 1–8 are formed from an electrical conducting material, such as one of the various metals or alloys thereof adapted for this purpose. When the base R is formed from glass as shown in FIGURES 3 and 4, glass beads S project therefrom to sealingly engage upper segments of pins 1–9 and reduce the probability of inadvertent loosening of the pins from the base due to shock or vibration. A number of longitudinally and transversely spaced bores (not shown) are formed in panel P which serve to support a number of electrical conducting members A–J inclusive that are longer than the thickness of the panel. Portions of members A–J project forwardly and rearwardly from panel P.

In FIGURES 3 and 4 it will be seen that the members B, F, G and J are longitudinally aligned, as are the members C, D and H. Members A and I are disposed adjacent members C and H respectively, as is member E relative to the members F and G. A number of thin, elongate high resistance electrical conducting filaments AB, BF, CD, DE, DH, GJ, and JI are provided which are situated slightly forward of panel P, and each of these filaments are connected to the two spaced electrical conducting members correspondingly identified. In FIGURE 3 it will be seen that filaments AB, DE, JI are substantially parallel, as is also the case with filaments CD, BF and filaments DH and GJ.

Stiff, elongate electrical conductors 11–19 inclusive project upwardly from portions of the pins 1–9 respectively, within tube Q, as shown in FIGURES 3, 4 and 6.

The conductor 11 (FIGURES 4 and 6) which is disposed adjacent the rear surface of panel P, serves to connect the pin 1 to rear portions of the electrical conducting members B, D, J and K. Pin 2 is connected by conductor 12 to the rear portion of member G, and conductor 13 serves to connect pin 3 to the rear portion of member E.

The rear portion of member F is connected by conductor 14 to the upper portion of pin 4, and pin 5 is connected by conductor 15 to the rear portion of member A. Conductor 16 serves to connect the rear portion of member C to pin 6, and conductor 17 joins pin 7 to the rear portion of member H. Pin 8 is connected by conductor 18 to one terminal L of an incandescent bulb T provided with a filament KL. The other terminal K of bulb T is connected to conductor 11, as shown in FIGURE 6.

The small incandescent bulb T is supported in an opening 36 formed in panel P (FIGURE 3). Pins 2 and 8 are longer than the balance of the pins, as may be seen in FIGURES 3 and 4. The upper portions M and N of pins 2 and 8 respectively, are bent to form hooks which extend through openings 38 and 40 in panel P to support the panel in tube Q at a fixed elevation above the base R.

Operation of the invention O is relatively simple. The pins 1–9 inclusive are inserted in a conventional socket (not shown), and when the pins are selectively energized by a low voltage electric current, they cause all, or a portion of the filaments previously described to be heated into incandescense to define a desired symbol. In the example illustrated and described herein, the symbols may be zero, with the numerals 1–9 inclusive being either with or without a decimal point on one side thereof.

A conductor 11 is connected to pin 1 (FIGURE 2), and extends to a first end of each of the filaments AB, BF, CD, DE, DH, JI and JG, as well as the terminal K. Thus, pin 1 and conductor 11 always form one leg of an electric circuit to heat the filaments above mentioned to define a desired one of the symbols.

Listed below are the pins which must be electrically energized to provide the second leg of the circuit which forms a desired symbol by heating the filaments to incandescense.

| Symbol to be formed: | Pins which must be electrically energized to form second leg of circuit |
|---|---|
| 1 | 6, 7 |
| 2 | 5, 4, 3, 7, 9 |
| 3 | 5, 4, 3, 2, 9 |
| 4 | 6, 4, 3, 2 |
| 5 | 6, 5, 3, 2, 9 |
| 6 | 7, 6, 5, 3, 2, 9 |
| 7 | 5, 4, 2 |
| 8 | 9, 7, 6, 5, 4, 3, 2 |
| 9 | 9, 6, 5, 4, 3, 2 |
| Decimal point | 8 |
| 0 | 9, 7, 6, 5, 4, 2 |

Thus, from the above tabulation it will be seen that to produce the numeral 8 with a decimal point to the left thereof as shown in FIGURE 1, pin 1 will be electrically energized to provide one leg of an electric circuit, with the other leg of the circuit energizing pins 9, 7, 6, 5, 4, 3 and 2 to define the numeral 8. The decimal point will be illuminated when an electric circuit including pins 1 and 8 is completed.

The read-out tubes O normally are not used singly, but in banks of tubes arranged in side-by-side relationship. The quantity of tubes O required is determined by the number to be projected by the display system.

Although the invention has been described and illustrated as being one which selectively produces a desired two-dimensional number of high intensity light, it will be apparent that the filaments AB, BF, CD, DE, DH, JI and JG, and others which could be added thereto, can be arranged on the panel P to produce any desired symbol such as letters, and the like.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. In an electrically operated display device of the type including a plurality of spaced filaments, which when selectively and electrically energized, become incandescent and define any one of a plurality of symbols, a transparent evacuated tube having an outwardly curved first end and a second open end, a base that closes said second end, a first electrical conducting pin and a group of second pins, the mid-portions of which project into said tube, with second portions of said pins projecting outwardly from said base, the improvement for viewing said symbols, comprising:
  (a) a rigid longitudinally extending rectangular panel of light-absorbing material, the first and second ends of which are disposed in said tube, which first end is connected to at least a portion of said pins, with said second end abutting against said first curved end, which pins and curved end cooperatively support said panel in a fixed position in said tube, with a plurality of spaced transverse openings extending through said panel;
  (b) a plurality of electrical conducting members disposed in said openings and extending forwardly and rearwardly from said panel, with each of the forwardly extending ends of said electrical conducting members supporting at least one end of one of said filaments a predetermined distance forwardly of said panel; and
  (c) a plurality of first electrical conductors extending from said first pin to a first plurality of said electrical conducting members and a plurality of second electrical conductors extending from said group of second pins to a second plurality of said electrical conducting members, with said first and second electrical conductors being so arranged that when an electric circuit is completed to said first pin and a selected portion of said second plurality of said electrical conducting members, a desired portion of said filaments are energized to define one of said symbols.

2. A display device as defined in claim 1, wherein at least the forward surface of said panel is black to absorb a maximum of light radiated from said filaments thereto.

3. A display device as defined in claim 1, wherein said panel is formed from a ceramic material that is black at least on the forward surface thereof.

4. A display device as defined in claim 1, wherein said filaments are so arranged that each one is substantially parallel to at least another of said filaments, with said filaments when selectively energized, forming high intensity light images of numerals one to nine inclusive, as well as zero.

5. A display device as defined in claim 1, which further includes:
  (d) electrically operated means within said tube for forming a high intensity light image of a decimal point when said means are electrically energized; and
  (e) electrical conducting means connected to a selected plurality of said pins and to said electrically operated means for supplying electrical energy thereto.

6. A display device as defined in claim 1, wherein said electrically operated means is a small incandescent bulb disposed within said tube.

7. A display device as defined in claim 1, wherein said tube and base are formed from the same material.

(References on following page)

References Cited

UNITED STATES PATENTS

| | | | |
|---|---|---|---|
| 1,549,716 | 8/1925 | Skaupy et al. | 313—109.5 X |
| 2,491,237 | 12/1949 | Way | 313—222 X |
| 2,618,697 | 11/1952 | Metcalf | 313—210 X |
| 2,878,418 | 3/1959 | Garfinkel et al. | 315—69 |
| 2,991,388 | 7/1961 | Wightman | 313—109.5 |

FOREIGN PATENTS 281,767  10/1913  Germany.

JAMES W. LAWRENCE, *Primary Examiner.*

P. C. DEMEO, *Assistant Examiner.*

U.S. Cl. X.R.

313—110, 272; 315—68